(12) United States Patent
Kumagai

(10) Patent No.: US 8,275,505 B2
(45) Date of Patent: Sep. 25, 2012

(54) METHOD AND CONTROL SYSTEM FOR CONTROLLING AN AUXILIARY DEVICE OF A VEHICLE

(75) Inventor: Masatoshi Kumagai, Hitachi (JP)

(73) Assignee: Clarion Co., Ltd., Tokyo (JP)

( * ) Notice: Subject to any disclaimer, the term of this patent is extended or adjusted under 35 U.S.C. 154(b) by 242 days.

(21) Appl. No.: 12/841,567

(22) Filed: Jul. 22, 2010

(65) Prior Publication Data

US 2011/0022257 A1    Jan. 27, 2011

(30) Foreign Application Priority Data

Jul. 27, 2009    (EP) .................................... 09166512

(51) Int. Cl.
*B60L 9/00*     (2006.01)
*G06F 7/00*     (2006.01)

(52) U.S. Cl. ........................................... 701/22; 701/36

(58) Field of Classification Search ........................ None
See application file for complete search history.

(56) References Cited

U.S. PATENT DOCUMENTS

| | | | |
|---|---|---|---|
| 2004/0194479 A1 | 10/2004 | Umebayashi et al. | |
| 2007/0144723 A1* | 6/2007 | Aubertin et al. | 165/202 |
| 2008/0114495 A1 | 5/2008 | Suyama et al. | |
| 2010/0023210 A1* | 1/2010 | Flick | 701/36 |

FOREIGN PATENT DOCUMENTS

| | | |
|---|---|---|
| DE | 10 2004 004 302 A1 | 8/2004 |
| JP | 2007-269161 | 10/2007 |

OTHER PUBLICATIONS

European Search Report.

* cited by examiner

*Primary Examiner* — Fahd Obeid
(74) *Attorney, Agent, or Firm* — Antonelli, Terry, Stout & Kraus, LLP.

(57) ABSTRACT

The invention relates to a method and a control system for controlling an auxiliary device of a vehicle, wherein the auxiliary device is automatically started at a starting time which is determined based on an estimated departure time of the vehicle. In particular, the invention relates to an air-conditioning device which is automatically started for pre-air-conditioning (PAC) based on an estimate departure time of an electric or hybrid vehicle. The invention enables a precise and flexible automatic determination of an activation time of the auxiliary device, wherein determining a time of usage of at least one home appliance of a user of the vehicle; determining a departure time of the vehicle based on the time of usage of the at least one home appliance; and determining a starting time of said auxiliary device based on the determined departure time of the vehicle are determined.

17 Claims, 4 Drawing Sheets

|  | appliance | | | | EV |
|---|---|---|---|---|---|
|  | A | B | C | ... | |
| day 1 | 6:30 | 6:20 | 7:00 | ... | 7:30 |
| day 2 | 6:55 | 6:30 | 7:50 | ... | 8:00 |
| day 3 | 6:55 | 6:50 | 7:30 | ... | 7:50 |
| day 4 | 7:20 | 7:00 | 7:30 | ... | 8:20 |
| day 5 | 6:45 | 6:55 | 7:10 | ... | 7:40 |
| ... | ... | ... | ... | ... | ... |

|  | appliance | | | |
|---|---|---|---|---|
|  | A | B | C | ... |
| day 1 | 60 | 70 | 30 | ... |
| day 2 | 65 | 90 | 10 | ... |
| day 3 | 55 | 60 | 20 | ... |
| day 4 | 60 | 80 | 50 | ... |
| day 5 | 55 | 45 | 30 | ... |
| ... | ... | ... | ... | ... |
| average | 59 | 69 | 28 | |
| variance | 18 | 305 | 220 | |

FIG. 4

METHOD AND CONTROL SYSTEM FOR CONTROLLING AN AUXILIARY DEVICE OF A VEHICLE

CLAIM OF PRIORITY

The present application claims priority from EP Patent application serial No. EP09166512.5 filed on Jul. 27, 2009, the content of which is hereby incorporated by reference into this application.

BACKGROUND OF THE INVENTION

1. Field of the Invention

The invention relates to a method and a control system for controlling an auxiliary device of a vehicle, wherein the auxiliary device can be automatically started at a starting time which is determined based on an estimated departure time of the vehicle. In particular, the invention relates to an air-conditioning device which can be automatically started for pre-air-conditioning (PAC) based on an estimated departure time of an electric and/or hybrid vehicle.

2. Description of the Related Art

In electric vehicles, the maximum cruising distance of the vehicle is limited due to the limited capacity of the batteries. If air-conditioning equipment is employed while cruising, this air-conditioning equipment consumes energy which is therefore not available for driving. As a result, the maximum cruising distance is shortened due to the employment of the air-conditioning equipment.

It may be possible to employ pre-air-conditioning (PAC) while the vehicle is connected to an external power supply for battery charging. The pre-air-conditioning is started at a programmable starting time prior to an estimated departure time of the electric vehicle. The pre-air-conditioning cools or heats the passenger cabin of the vehicle while the vehicle is connected to the battery charger such that the air-conditioner draws the energy from the battery charger connection and not from the battery. As a consequence, the passenger cabin is air-conditioned at the time of departure and the amount of energy consumed by the air-conditioning equipment while the vehicle is driving may be reduced. As a result, the maximum cruising distance may be increased.

However, it is a difficult task to estimate the optimum starting time of the operation of the air-conditioning device because the departure time is often unknown. Even if the driver is commuting, the basically periodical use of the vehicle may be disturbed by irregular events. The starting time of the pre-air-conditioning can be determined within an ordinary timer control. The driver may specify his departure time manually in advance and the vehicle starts the pre-air-conditioning operation accordingly.

The starting time of the pre-air-conditioning operation may also be directly programmed by the driver. However, it may be inconvenient for the driver to manually specify the departure time and/or the starting time of the pre-air-conditioning prior to every driving. If the starting time of the pre-air-conditioning is not correctly determined, the energy may be employed in an ineffective way. If the pre-air-conditioning is started too early, the air-conditioning equipment operates for an interval which is too long and therefore uses too much energy or stops after a pre-determined fixed time and the temperature in the vehicle will go back to the initial temperature so that the inputted energy is wasted, while on the other hand, a too short period of pre-air-conditioning may result in an incorrect temperature at the departure time. These problems will lead to the necessity of using valuable battery power of the vehicle after its departure. Similar problems may occur in vehicles having programmable seat-heaters or an auxiliary heating often used in countries with a colder climate.

From a more general point of view, the problem may relate to any auxiliary device of a vehicle that consumes electrical power, where the starting time of the auxiliary device may depend on the departure time of the vehicle. For example, a vehicle driver might want to synchronize his vehicle multimedia files, e-mails etc. with the data from his home network shortly before leaving with his car. Although in non-electric vehicles the battery power issue is not as crucial as in electric vehicles, an incorrect timer programming may result in either a loss of energy or in a reduction of comfort.

The document JP 2007-269161 A teaches an air-conditioner control device which starts an air-conditioning device using a statistical approach based on a frequency function. This device, however, cannot react to changes in the driver's habits, e.g. if he departs later or earlier as usual etc.

SUMMARY OF THE INVENTION

It is an object of the invention to provide a method and a control system for controlling at least one of an auxiliary device of a vehicle enabling a more flexible and more precise automatic determination of an activation time of said auxiliary device in order to increase the cruising range of the vehicle and the convenience for the driver.

This object is achieved according to the features of the independent claims. The dependent claims refer to preferred embodiments of the invention.

The invention relates to a method for controlling at least one auxiliary device of a vehicle. Preferably, the auxiliary device may be one of a heating device, cooling device and/or air-conditioning device of the vehicle. The heating device may also be a programmable seat-heater or an auxiliary heating (park heating). The auxiliary device may also be an on-board multimedia device, the database of which can be synchronized with the multimedia database of the driver's home network. The vehicle may in particular be an electric vehicle and/or a hybrid car.

The method may include the step of determining a time of usage of at least one home appliance of a user of the vehicle. The method may include the step of determining a departure time of the vehicle based on the time of usage of the at least one home appliance. The method may include the step of determining the necessary starting time of the at least one auxiliary device based on the determined departure time of the vehicle.

If the driver changes his departure time on a daily basis, there may be a strong temporal correlation between the use of the vehicle and the use of one or more home appliances. Home appliances used with a strong temporal correlation with the vehicle may include an electrical kettle, a toaster, a refrigerator, a cooking heater, room light, television, an electronic key for the door, an elevator, an alarm clock, the shower, the toilette, or the like. When the user gets up in the morning, he turns on the room light, checks e.g. some news in the TV, boils water in the kettle, uses a coffee machine or tea machine, opens the refrigerator to take some food, prepares breakfast with a cooking heater or a toaster and then uses the vehicle to go to his office. These processes are typically personally optimized and occur on a regular basis for work days. Eventually different schedules can be employed for holidays and vacations. Therefore, at least on work days, there is typically a strong correlation between the time of vehicle departure and the time of usage of the home appliances. When the driver needs to leave the house at 7:30 h, he or she uses for example the cooking heater at around 6:30 h while the cooking heater would be used at 7:00 h when he or she needs to leave at 8:00 h. The invention uses this relative correlation between the departure time of the vehicle and the time of usage of at least one home appliance in order to precisely and at the same time flexibly determine the departure time of the vehicle on a relative basis. The invention allows for a relative determination of the starting time instead of an absolute fixed time for a start- or an activation time of the auxiliary device of the vehicle.

This departure time may be used to switch on the at least one auxiliary device, e.g. the air-conditioning equipment for pre-air-conditioning, at some interval before the estimated departure time of the vehicle.

The automatized starting of the auxiliary device is employed only when the vehicle is connected to a charger power supply in case the vehicle is an electric vehicle and/or hybrid vehicle powered by batteries. In this case, increased energy efficiency can be obtained.

The step of determining the departure time of the vehicle may include determining time differences between prior times of usage of at least one home appliance and subsequent departure times of the vehicle based on usage data of the at least one home appliance and of the vehicle stored in respective usage databases. The determined time differences may then be averaged in order to obtain an average time difference between the time of usage of a particular home appliance and the subsequent departure time of the vehicle. The usage data may be stored in a storage system of a home appliance control system and/or of the electric vehicle.

In other words, data describing the previous usage of the at least one home appliance, e.g. the usage in the past days, week, or month, etc., are stored in a database and may be used in combination with stored data on the respective departure times of the vehicle, i.e., the subsequent departure time of the vehicle that followed a past usage of the at least one home appliance, to determine an average time difference between the respective usage of the home appliance and the actual departure times of the vehicle. Having determined such an average time difference for the at least one home appliance, the next departure time of the vehicle may be estimated by adding the determined average time difference to a current usage time of this home appliance. The determined departure time is therefore an estimated departure time (which may still deviate slightly from the actual departure time). Due to this averaging, the pre-heating or pre-cooling operation may be started at a time that enables optimized mean energy consumption, while at the same time, increases the convenience for the driver.

In order to further improve the accuracy and reliability of the determination of the departure times of the, a variance of said time differences may be determined for a plurality of home appliances, wherein the home appliance used for determining the departure time of the vehicle having the smallest variance of the time differences will become a trigger appliance. The home appliance showing the lowest variance is the one the usage of which is most correlated with the usage of the vehicle. This home appliance is selected in order to enable a trustworthy prediction of the departure time. The departure time can be estimated based on the average time differences between the usage of multiple home appliances and the departure time of the vehicle, wherein the departure time may be estimated using some weighted average of the values obtained from the various home appliances.

Two or more home appliances may be selected as potential trigger appliances and prioritized based on their variance or correlation values, wherein a potential trigger appliance may be a home appliance having a determined variance value that is smaller than a pre-determined value in order to filter out home appliances not suitable for estimating a departure time. An appliance out of the set of potential trigger appliances that is last used by the user may be selected as the actual trigger appliance. It may be advantageous to have more than one potential trigger appliance in case the driver uses differing appliances over the time or in case the driver uses a second home appliance with a lower variance after he has used a first appliance with a higher variance value relative to the second home appliance. The starting time of the auxiliary device may then be updated based on the usage time of the second appliance, enabling a more accurate forecast of the vehicle departure time.

It is possible to implement some more sophisticated algorithms for determining the estimated departure time, e.g. based on neural networks evaluating the actions of the driver or by using correlation algorithms that underweight and/or exclude statistical anomalies in case the usage data for the vehicle and home appliances shows statistical blips. By way of example, the driver may use the coffee machine from Monday through Friday about 30 min. before leaving with the vehicle, with the exception of Wednesdays, where he goes running instead of making coffee. An algorithm capable of recognizing and then underweighting and/or excluding such statistical anomalies may then identify the coffee machine as the most reliable trigger appliance for week-days except for Wednesdays. On Wednesdays, another trigger appliance would be used instead of the coffee machine.

In particular, it is proposed that said step of determining the departure time of the vehicle may include determining a correlation between prior times of usage of at least one home appliance and subsequent departure times of the vehicle based on usage data of the at least one home appliance and of the vehicle stored in one or more databases.

A biasing of the estimations due to the mixing of working days and holidays can be avoided if the averages, variances and/or correlations are determined based on stored usage data relating to working days.

In case the driver's schedule varies with the working days, the average and/or variance can be calculated separately for different working days or time intervals. For the prediction of departure times during holidays, different data obtained for holidays only may be employed. In order to further improve the accuracy, a different trigger home appliance might be prioritized for different time periods by selecting the home appliance that, for a given time period of a day, week, or month, is showing the lowest variance and best correlation with the usage of the vehicle.

The determining of the variances and/or the correlations may be repeated at regular intervals, e.g. weekly, in order to account for changing preferences of the driver.

Moreover, it is possible to predict the departure time of the vehicle based on the type of usage of the home appliance selected as the trigger appliance. If e.g. the driver uses a coffee machine for making an espresso, this might indicate that he is in a hurry and that the departure is rapidly approaching, while using a coffee machine to make a cappuccino might indicate that the time schedule is more relaxed. This type of correlation may in particular be learned by a neural network implemented in the control system.

According to another aspect of the invention, the method may comprise the step of determining the sequence of usage of a plurality of home appliances before using the vehicle and selecting the trigger appliance based on the determined sequence in order to more accurately determine the departure time of the vehicle. For example, the vehicle driver would normally use a first sequence of home appliances if he was on a regular schedule on a work day, such as the light switch in his bed-room, followed by the light switch in the bath room, followed by the coffee-machine. But if he was on a more relaxed schedule, he could use a second sequence, wherein he uses the coffee-machine to have break-fast before going to the bathroom. A different trigger appliance and/or different average time difference may be determined for every determined sequence in order to improve the accuracy of the determined estimated departure time of the vehicle.

A further aspect of the invention relates to a control system for controlling at least one auxiliary device of a vehicle, wherein the control system implements the above described method. The auxiliary device may in particular be at least one of a heating device, cooling device, and/or air-conditioning device.

The control system may include means for determining a time of usage of at least one home appliance of a user of the vehicle and control means for determining the departure time of the vehicle based on the time of usage of the at least one home appliance. The control means may be further configured to determine a starting time of the auxiliary device based on the determined departure time of the vehicle and to automatically start the auxiliary device at the determined starting time.

The control system may be used for an electrical or hybrid vehicle and wherein the auxiliary device may be at least one of a heating device, cooling device, and/or air-conditioning device and wherein the system further comprises a connection to a charger power supply for charging batteries of the vehicle, wherein the control means may be configured to start the auxiliary device at said starting time of the operation of the device only if the vehicle is connected to the charger power supply.

The data connection for indicating that a charger power supply is connected to the vehicle may be integrated in the control system controlling the household appliances of the driver. The connection to the charger power supply may be used as a control signal connection for activating and/or enabling the communication between the vehicle and the household control system, which may start the auxiliary device via the control signal connection.

The control system may further include at least one usage database for storing prior departure times of the vehicle and/or prior times of usage of the at least one home appliance, wherein the control means is configured to determine an average time difference between prior times of usage of at least one home appliance and subsequent departure times of the vehicle to estimate the departure time of the vehicle. The at least one usage database may be connected to the household electronics control system.

It may also be possible to use a separate appliance and vehicle usage database for storing the time of usage of the appliance and the vehicle.

This usage database may be used to evaluate the correlations between the usage of the at least one home appliance and the departure time of the vehicle. The usage data of the vehicle may be uploaded from the vehicle to the vehicle usage database via a dedicated signal connection. The control system may further include a temperature sensor for measuring an inside temperature of the vehicle and/or an outside temperature in order to enable a temperature-dependent determination of the starting time of the operation of the auxiliary device.

BRIEF DESCRIPTION OF THE DRAWINGS

Embodiments of the invention will be described by way of examples with reference to the following schematic drawings:

FIG. 4 shows a table indicating intervals between a time of appliance usage and the departure time of the electric vehicle for several days together with average and variance values.

DETAILED DESCRIPTION OF THE PREFERRED EMBODIMENTS

Further features and advantages of the invention will become apparent from the following description of preferred embodiments of the invention. This description and the claims include multiple features in particular combinations. The skilled person will consider further combinations of the characteristic features of the embodiments in order to adapt the method and/or the control system to further possible fields of application of the invention.

(First Embodiment)

Figure 1:
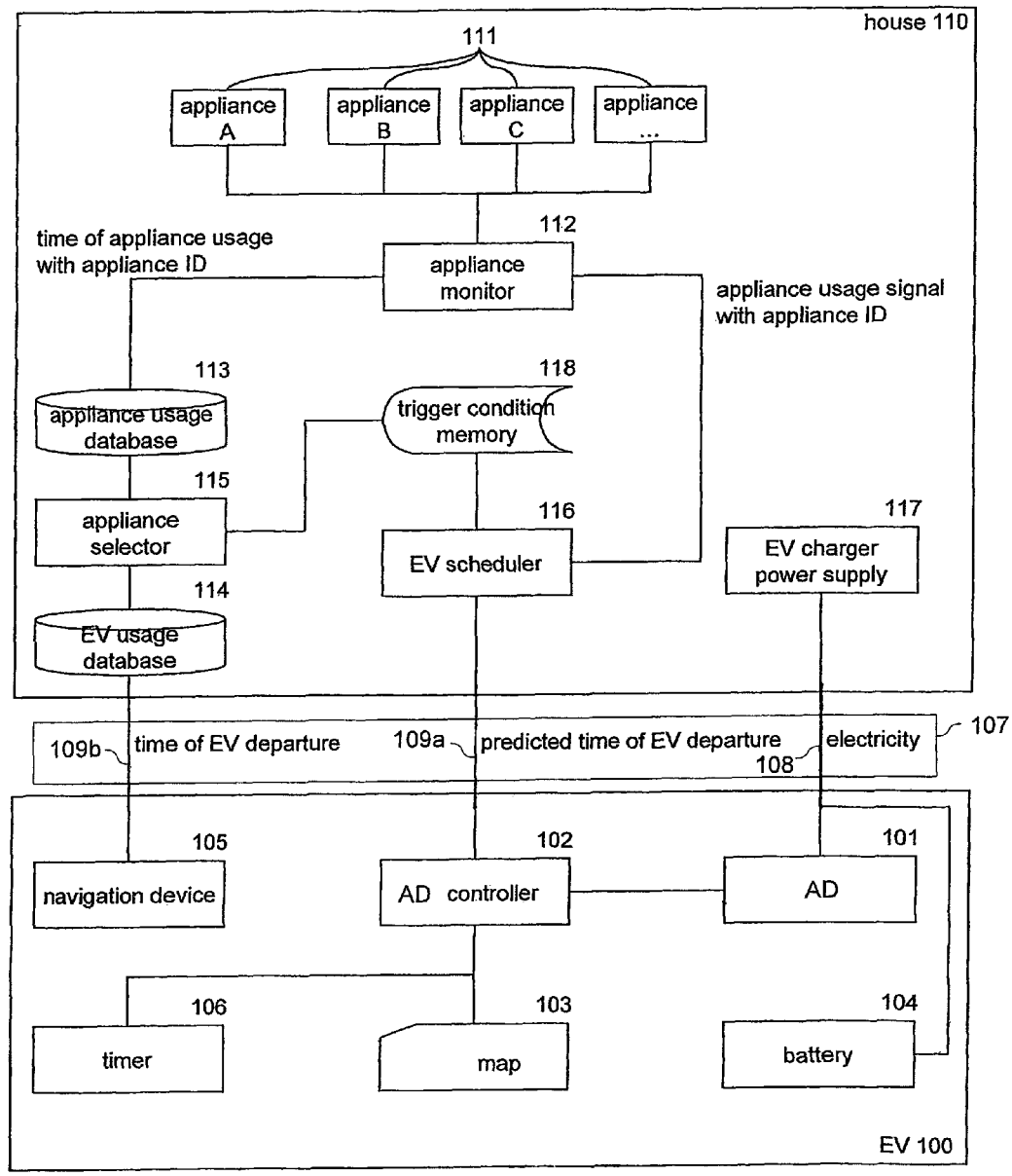
FIG. 1 shows a block diagram of an electric vehicle and a house control network.

FIG. 1 shows a block diagram of a house 110 including a house control network (home network) and of an electric vehicle 100. The house 110 comprises means for activating an auxiliary device (AD) controller 102 of the vehicle 100, which in turn controls an auxiliary device (AD) 101 for e.g. heating and/or cooling a passenger cabin of the vehicle 100. The device 101 can be an air-conditioning system (AC) which may be supplied with energy either by a battery 104 of the electric vehicle 100 or by a charger power supply 117 of the house if the vehicle 100 is connected to the charger power supply 117 via an electrical connection means 107.

The connection means 107 can include power lines 108 for charging the battery 104 and signal lines 109a, 109b for transmitting low-voltage control signals. The signal line 109a enables a communication between a scheduler 116 located in the control unit of the house and the AD controller 102 located in the vehicle 100. The signal line 109b enables a communication between a navigation device 105 of the vehicle 100 and a vehicle usage database 114 located in the house 110. If the connection means 107 are activated by connecting a connector upon arrival of the vehicle 100 in a garage or the like, the usage data of the vehicle 100 can be uploaded to the vehicle usage database 114 in the house 110 and are recorded therein. The house 110 comprises multiple household appliances 111 like a cooker, a kettle, light bulbs, a hot water preparing system, a coffee machine, a refrigerator, etc.

The operation of the appliances 111 is detected via an appliance monitor 112. The usage data detected by the appliance monitor 112, in particular the starting time and the end time of the appliance usage, are stored in an appliance usage database 113. Based on the data in the appliance usage database 113 and in the vehicle usage database 114, an appliance selector 115 calculates averages and variances of intervals between the usage of an appliance 111 and the actual time of the departure of the vehicle. The appliance selector 115 selects one of the appliances 111 as a trigger appliance triggering the auxiliary device activation, e.g. an air-conditioning device of the vehicle 100, based on the above-mentioned calculation.

A vehicle scheduler 116 is connected to the appliance monitor 112 and a trigger condition memory 118. When the appliance monitor 112 detects the usage of an appliance and an ID of the appliance is the same with that stored in the trigger condition memory 118, the scheduler 116 predicts the time of the vehicle departure, which is the current time plus an average interval stored in the trigger condition memory 118. The predicted time of the vehicle departure is then sent to the auxiliary device controller 102, e.g. the AC controller of the electric vehicle 100.

Figures 2, 3:
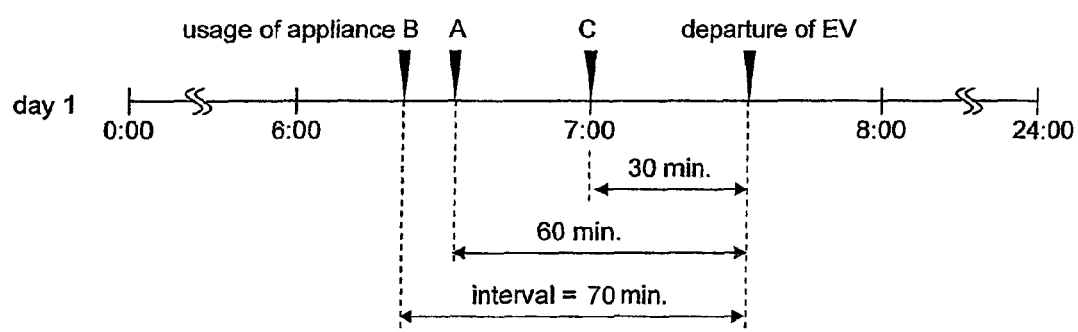
FIG. 2 shows a database for storing the time of appliance usage and the actual departure time of the electric vehicle.
FIG. 3 shows a table indicating a calculation of a time interval between the appliance usage and the departure of the electric vehicle.

FIG. 2 shows the appliance usage as stored e.g. in the appliance usage database 113 with the vehicle departure times stored e.g. in the vehicle usage database 114. As can be seen from the table in FIG. 2, the usage of the respective appliances A, B, C are different for the different days 1, 2, 3, 4, 5, wherein day 1 may stand for Monday, day 2 may stand for Tuesday, etc. As can be also derived from FIG. 2, the actual departure time of the vehicle is different for each day.

Using the data as shown in FIG. 2, a time line can be evaluated as shown in FIG. 3. It can be seen that e.g. the time between the usage of the appliance C and the actual departure of the vehicle is 30 minutes. The time between the usage of the appliance A and the departure of the vehicle is 60 minutes and the time between the usage of the appliance B and the departure of the vehicle is 70 minutes. These interval times between the appliance usage and the departure of the vehicle are calculated for each relevant appliance for each relevant day.

The interval times as mentioned above are shown for the different days and the different appliances in the table of FIG. 2. In the two last lines the results of a calculation of average values and variance values are shown being performed by the appliance selector 115 as mentioned above.

As can be seen, the average values and the variances differ strongly from each other. If the variance is large it can be concluded that there is a weak correlation between the time of the appliance usage and the time of the actual vehicle departure. On the other hand, if the variance is small it can be concluded that there is a strong correlation between the time of the appliance usage and the time of the actual vehicle departure. Based on this result, the appliance selector 115 can chose the appliance 111 with the smallest variance as a trigger appliance to start the activation of the auxiliary device 101, e.g. to start the pre-air-conditioning. The appliance selector 115 can store the ID of the respective appliance 111 (e.g. appliance A, B, C . . . ) in the trigger condition memory 118. Furthermore, the appliance selector 115 can store the respective average interval of the selected appliance 111 in the trigger condition memory 118.

In the example of FIG. 4, the appliance A is chosen as the trigger appliance and the average interval is 59 minutes. The selection of the trigger appliance based on the calculation of the average values and the variance values can be done cyclically for example once a day, once a week or once a month (cyclic time period). The selection and the determination of the trigger appliance together with its average interval, as mentioned above, can also be influenced by specific changes of the vehicle usage by the driver. It may be e.g. possible that within a cyclic time period of e.g. one week, in which the same trigger appliance is used and in which the same calculated average interval is used to predict a departure time of the vehicle, the cyclic use of these data is stopped and a new calculation is started, when the actual departure time of the vehicle deviates from the estimated departure time by more than a predetermined value. Such a predetermined value may by e.g. 10% of the predicted and prestored time interval (in case of FIG. 4: 10% of 59 minutes).

After the preselected cyclicity has been stopped by a new calculation, the preselected cyclicity can be started again. It may also be possible to lengthen or to shorten the cyclicity depending on a comparison between the actual departure times of the vehicle and the estimated (calculated) departure times of the vehicle.

Regarding the calculation of the appropriate variance it shall be mentioned that each row in FIG. 2 should be the data of the same day and the same time period, meaning that the time of the actual vehicle departure is that of just after the usage of the appliances B, A, C as shown in FIG. 3.

As mentioned above, when the appliance monitor 112 detects the usage of an appliance and the ID of the appliance is the same with that stored in the trigger condition memory 118, the vehicle scheduler 116 predicts the time of the vehicle departure, which is the current time plus the average interval stored in the trigger condition memory 118. The predicted time of the vehicle departure is then sent to the auxiliary device controller 102, e.g. the AC controller of the vehicle 100 so that, the controller 102 can decide the starting time of the auxiliary device 104 by the predicted time of the vehicle departure instead of the specified time by the driver.

A map 103 may be provided for storing the activation and/or starting times of the air conditioning device 101 which has been downloaded from the scheduler 116. The map 103 can be updated when the vehicle 100 is connected via the connection means 107.

Accordingly, the invention provides for a relative determination of the starting time of the auxiliary device instead of an absolute fixed time for a start- or an activation time of an auxiliary device 101 of the vehicle 100. This gives a large enhancement to the accuracy of the determination for the starting times and/or the activation times of auxiliary devices 101 which lead to an increased energy efficiency as mentioned above.

The above described signal connections between the vehicle 100 and the house 110 may be replaced with wireless data connections in alternative embodiments of the invention.

The auxiliary device controller 102 interacts with a timer 106 for starting e.g. the air conditioning device at a suitable time interval prior to the estimated departure time of the vehicle 100. This time interval may be influenced based on the outside temperature and on the temperature inside the vehicle 100 which may be determined using suitable temperature sensors (not shown).

If the appliance monitor 112 detects the usage of one particular trigger appliance 111, e.g., the usage of an electric kettle, refrigerator, a cooking heater, room light, a television, an electronic key for a door and/or an elevator, the scheduler 116 calculates the estimated departure time of the vehicle 100 by adding the prestored average time difference between the operation of the appliance 111 and the departure of the vehicle 100 to the actual time.

The appliance usage database 113 records the time of usage of each appliance detected by the appliance monitor 112. The vehicle usage database 114 records the times of the vehicle departures which are detected, e.g. by a navigation device 115 located in the vehicle 100. The appliance selector 115 calculates the average and variance of the time intervals between the appliance usage and the time of the vehicle departure in order to choose a particular trigger appliance for triggering the start of an auxiliary device, e.g. of the pre-air-conditioning operation of the device 101 (as mentioned above). The databases 113, 114 may also be integrated in one single database if suitable.

The time intervals/time differences between the usage of the appliances A, B, C and the departure of the vehicle are recorded as shown in FIG. 4. This table may be provided in the vehicle scheduler 116. For each appliance and for each day, a time interval between the time of appliance usage and the vehicle departure is stored. If these data are recorded for a couple of days, the system calculates for each appliance A, B, C the average time interval and the variance of the time intervals and writes these data in additional lines of the table.

Based on the variances, the appliance selector 115 selects the appliance with the lowest variance from the appliances the data of which are stored in the table according to FIG. 4, wherein appliances with an average time interval below a minimum time interval necessary for e.g. air-conditioning the passenger cabin to a desired temperature can be excluded from this selection. This minimum time may be adapted to the inside temperature of the vehicle and/or the outside temperature. After this selection, the estimated departure time of the vehicle is determined to be the current time plus the average time associated to the selected trigger appliance.

(Second Embodiment)

In alternative embodiments of the invention, estimated departure times may be calculated for multiple appliances used as trigger appliances as described above. The actual estimated departure time can then be calculated using a weighted average of the departure times calculated based on the individual trigger appliances. If e.g. the driver does not use one particular appliance on some particular day, this appliance may be excluded from the average and the estimated departure time values can be suitably adapted.

In the example of FIG. 4, the appliance A is chosen as the trigger appliance, because it has the lowest variance value. The average interval associated to the appliance A is 59 min. The selection of the trigger appliance is done at regular intervals, e.g. once a day or once a week. If the user uses the vehicle 100 e.g. one time in the morning and one time in the evening, different trigger appliances can be used in the morning and in the evening. The data in the rows of FIG. 4 which are used for calculating the average usage data relate to a particular type of day, e.g. a working day or a holiday. When calculating the averages, working days and holidays are preferably not mixed up.

Figure 5:
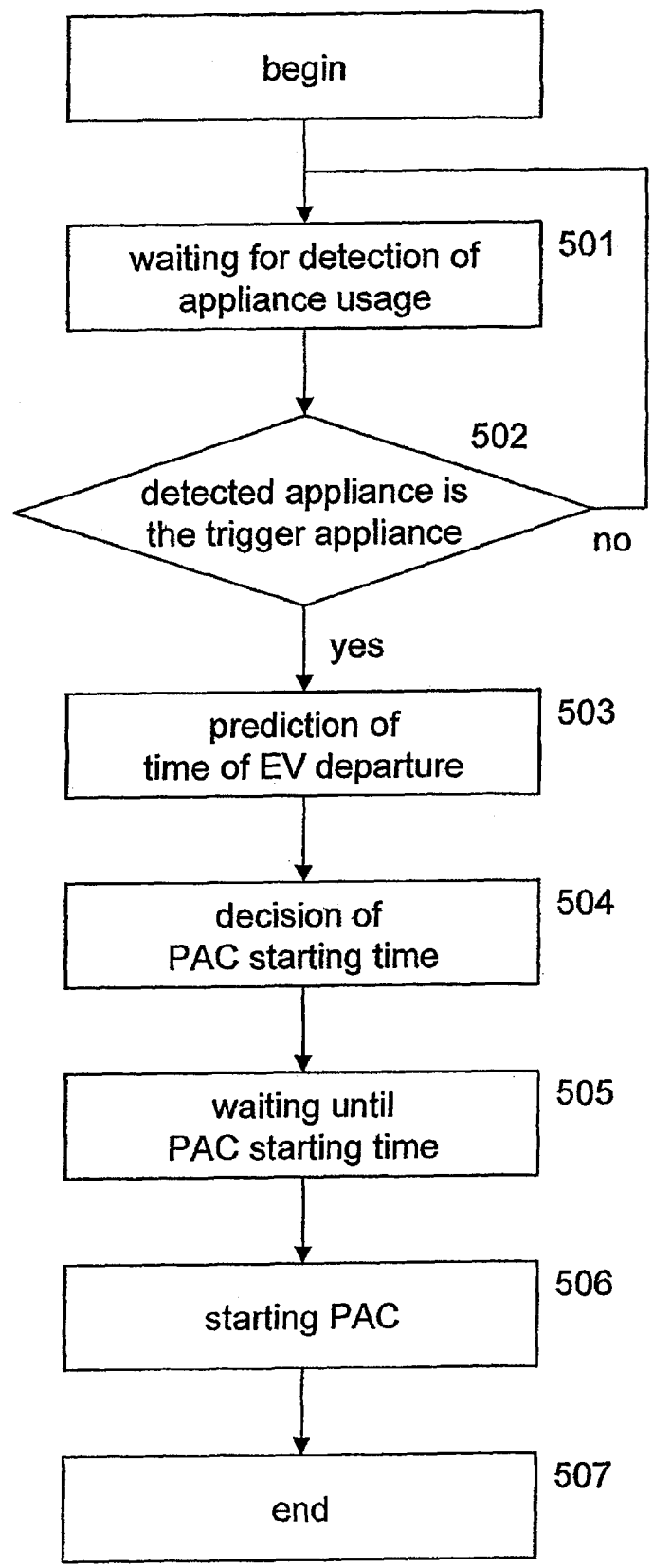
FIG. 5 shows a flow chart regarding the control of an auxiliary device, e.g. of a PAC.

FIG. 5 shows a processing flow of the procedure from the detection of usage of appliance 111 to starting e.g. a pre-air-conditioning operation of the device 101. In step 501, the vehicle scheduler 116 is waiting for input from the appliance monitor 112. In step 502, after getting a detection signal from the appliance monitor 112, the identification number (ID) of the detected appliance 111 is compared with an identification number (ID) of the trigger appliance 111 stored in the trigger condition memory 118 and if the identification numbers are identical, the process forwards to step 503. If the identification numbers do not correspond to each other, the process returns to previous step 501.

In step 503, the vehicle scheduler 116 predicts the vehicle departure time based on the data in the trigger condition memory 118. In step 504, based on the predicted departure time of the vehicle the controller 102 determines the starting time of the device 101 using the map 103. In step 505, the timer 106 waits until the starting time has come. In step 506, when the current time has reached the starting time, the timer 106 sends a starting signal to the controller 102 and the controller 102 starts the air conditioning device 101, using electricity provided from the vehicle charger power supply 117 in the house and not from the battery 104.

If the charger power supply 117 is not connected to the vehicle 100, the operation of the auxiliary device 101 is not activated in order to safe battery energy of the vehicle 100.

Features, components and specific details of the structures of the above-described embodiments may be exchanged or combined to form further embodiments optimized for the respective application. As far as those modifications are apparent for an expert skilled in the art they shall be disclosed implicitly by the above description without specifying explicitly every possible combination.

What is claimed is:

1. Method for controlling at least one auxiliary device of a vehicle, said method including the steps of:
   providing an appliance monitor that selects at least one home appliance as a trigger appliance having a time usage that is correlated with a vehicle departure time base on a determined time of usage of the at least one home appliance and a determined subsequent departure time of the vehicle;
   providing a controller that predicts a departure time of the vehicle based on a detected time of usage of the selected trigger appliance; and
   determines a starting time of said auxiliary device based on the predicted departure time of the vehicle.

2. Method according to claim 1, wherein said at least one auxiliary device is at least one of a heating device, cooling device, and/or air-conditioning device.

3. Method according to claim 1, further comprising the step of automatically starting said auxiliary device at the determined starting time only if the vehicle is connected to a charger power supply for the vehicle.

4. Method according to claim 1, wherein said step of predicting the departure time of the vehicle includes determining time differences between prior times of usage of at least one home appliance and subsequent departure times of the vehicle based on usage data of the at least one home appliance and of the vehicle stored in a usage database and determining the average time difference of said time differences.

5. Method according to claim 4, wherein a variance of said time differences is determined for a plurality of home appliances, wherein the home appliance used for determining the departure time of the vehicle having the smallest variance of the time differences selected as trigger appliance.

6. Method according to claim 1, wherein said step of predicting the departure time of the vehicle includes determining a correlation between prior times of usage of at least one home appliance and subsequent departure times of the vehicle based on usage data of the at least one home appliance and of the vehicle stored in a usage database.

7. Method according to claim 4, wherein said average time difference and/or said variance and/or said correlation is determined based on stored usage data relating to working days.

8. Method according to claim 5, wherein said determining of the variances and/or the correlations is repeated at regular intervals.

9. Method according to claim 1, wherein said auxiliary device is an air-conditioning device which is started for pre-air-conditioning at said starting time.

10. Method according to claim 1, wherein said departure time of the vehicle is determined based on a type of usage of at least one home appliance and/or based on a sequence of usage of a plurality of home appliances.

11. Control system for controlling at least one auxiliary device of a vehicle, said system including:
    an appliance monitor that selects at least one home appliance as a trigger appliance having a time of usage that is correlated with a vehicle departure time based on a determined time of usage of the at least one home appliance and a determined subsequent departure time of the vehicle; and
    a controller that predicts the departure time of the vehicle based on the detected time of usage of the selected trigger appliance, determines a starting time of said auxiliary device based on the predicted departure time of the vehicle, and automatically starts said auxiliary device at the determined starting time.

12. Control system according to claim 11, wherein the vehicle is an electrical vehicle and/or hybrid car, and wherein said auxiliary device is at least one of a heating device, cooling device and/or air-conditioning device and wherein the system further comprises connection means including powerlines in order to connect a charger power supply for charging batteries of the vehicle, wherein said controller is configured to start the auxiliary device at said starting time of the operation of the device only if the vehicle is connected to the charger power supply.

13. Control system according to claim 12, wherein said connection means includes signal lines for sending a start signal for starting the auxiliary device at said starting time.

14. Control system according to claim 11, further including a temperature sensor for measuring an inside temperature of the vehicle and/or an outside temperature and at least one usage database for storing prior departure times of the vehicle and/or prior times of usage of the at least one home appliance, and wherein said controller is configured to determine an average time difference between prior times of usage of at least one home appliance and subsequent departure times of the vehicle to estimate the departure time of the vehicle.

15. A vehicle using the control system according to claim 11.

16. Method according to claim 2, further comprising the step of automatically starting said auxiliary device at the determined starting time only if the vehicle is connected to a charger power supply for the vehicle.

17. Method according to claim 6, wherein said average time difference and/or said variance and/or said correlation is determined based on stored usage data relating to working days.

* * * * *